J. F. HAYNES.
COOKING VESSEL.
APPLICATION FILED OCT. 7, 1911.
1,034,233.
Patented July 30, 1912.
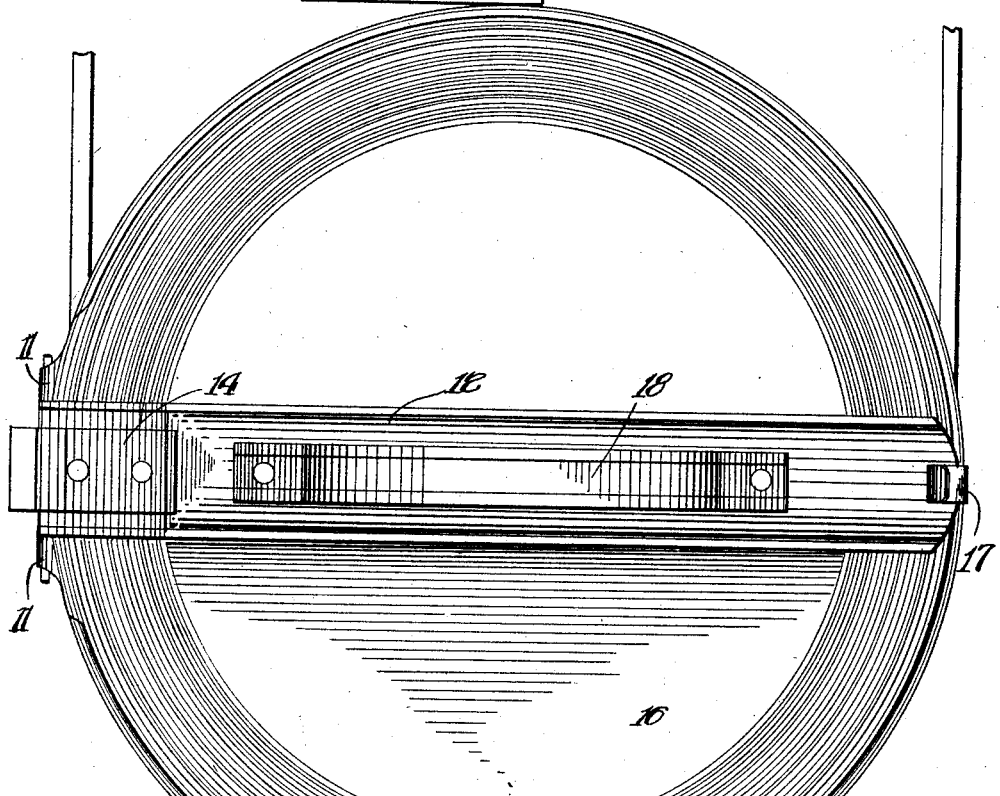
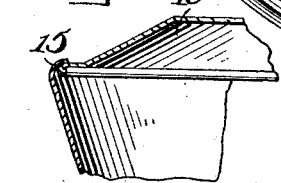
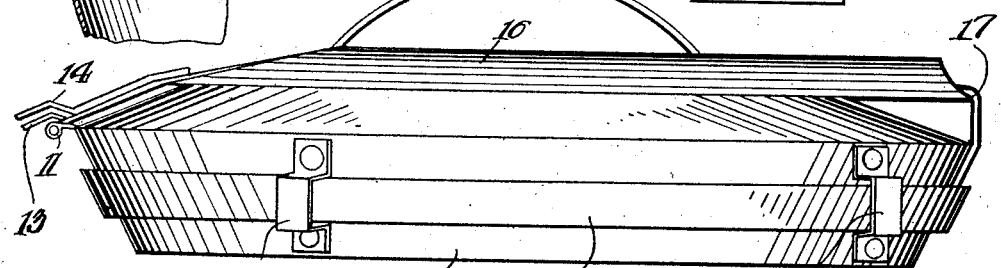
WITNESSES
Howard F. Costello
Ross Woodward
INVENTOR
John F Haynes.
E. E. Truman, Attorney

UNITED STATES PATENT OFFICE.

JOHN F. HAYNES, OF ROSWELL, NEW MEXICO.

COOKING VESSEL.

1,034,233.  Specification of Letters Patent.  Patented July 30, 1912.

Application filed October 7, 1911. Serial No. 653,377.

*To all whom it may concern:*

Be it known that I, JOHN F. HAYNES, a citizen of the United States, residing at Roswell, in the county of Chaves and State of New Mexico, have invented certain new and useful Improvements in Cooking Vessels, of which the following is a specification, reference being had therein to the accompanying drawing.

This invention relates to cooking vessels of the frying pan type, in which there is provided a handle which is pivotally connected with the frying pan so that the handle may be used as a clamp to secure a cover for the frying pan in position. This cover is formed from a plate very similar to a pie plate and fits beneath the flange carried by the frying pan. It should also be noted that the pivoted end of the handle is provided with tongues which form stops to limit the movement of the handle in one direction.

This invention is illustrated in the accompanying drawings, wherein:—

Figure 1 is a top plan view of a frying pan. Fig. 2 is a side elevation of the frying pan. Fig. 3 is an enlarged section through one section of the frying pan.

Referring to the accompanying drawings, it will be seen that this invention comprises a frying pan which consists of the body portion 10 which has its edge turned in to form the inwardly extending flange 15. This flange extends for the principal part of the circumference of the upper part of the frying pan, but has one portion cut and rolled outwardly to form the hinge ears 11, so that the handle 12 may be pivotally connected with the body portion. This handle has its edge portions formed into hinged ears which are positioned between the hinged ears 11 and has its central portion bent to form a tongue 13, which extends out beyond the hinged ears 11. A plate 14 is secured to the handle 12 and has its edge portion extended above the tongue 13 so as to assist in limiting the pivotal movement of the handle 12 in one direction. A cover 16 which is in the form of a tin plate is placed upon the frying pan and fits beneath the flange 15. This flange 15 keeps the cover in position so that when cooking out of doors there is no danger of the cover slipping from the frying pan and falling down upon the ground. A spring latch 17 is carried by the body portion and is intended to engage the free end of the handle when moved to the position shown in Fig. 2, so that an additional securing means is provided for holding the cover in position. It will thus be seen that when traveling about, food or other articles may be placed in the frying pan and the cover placed upon the pan and held in place by the handle. The frying pan will then form a receptacle in which food or other articles may be carried from place to place. The handle 18 is mounted on the handle 12 so that the frying pan may be carried about easily after being filled with any article which it is desired to carry. If it is desired to suspend the frying pan from the shoulder, a strap 20 may be passed through the eye 19 and the frying pan can then be suspended from the shoulder and very easily carried.

It will thus be seen that there has been provided a cooking utensil which is especially adapted for persons working out of doors and who have to cook their meals in the fields, since the frying pan not only acts as a cooking utensil but also is used as a receptacle to pack articles. It should also be noted that the cover for the frying pan may be used as a plate upon which to place the food which has been cooked in the pan.

What I claim is:—

A device of the character described comprising a body portion having inwardly turned edges forming an inwardly extending flange, the flange at one side of the body portion being cut and bent outwardly to form pivot ears, a handle having one end bent to form pivot ears pivotally mounted between the pivot ears of said body portion, a tongue extending from between the pivot ears of said handle, and a plate secured to said handle and having its outer end portion overhanging the tongue of said handle in spaced relation thereto.

In testimony whereof I hereunto affix my signature in presence of two witnesses.

JOHN F. HAYNES.

Witnesses:
 CY H. DAVIDSON,
 GRAVES C. WELTER.

Copies of this patent may be obtained for five cents each, by addressing the "Commissioner of Patents, Washington, D. C."